United States Patent [19]
Hillier

[11] Patent Number: 6,098,267
[45] Date of Patent: Aug. 8, 2000

[54] METHOD FOR FORMING SURFACE STRUCTURES FROM A SINGLE-SIDED MOLD

[75] Inventor: Loren C. Hillier, San Diego, Calif.

[73] Assignee: LEK Technologies, San Diego, Calif.

[21] Appl. No.: 09/222,198

[22] Filed: Dec. 29, 1998

[51] Int. Cl.⁷ .................................................. B23P 17/00
[52] U.S. Cl. ........................ 29/527.4; 156/212; 156/292
[58] Field of Search ............................ 29/527.4; 72/46; 428/116; 156/212, 213, 285, 292

[56] References Cited

U.S. PATENT DOCUMENTS

| | | | |
|---|---|---|---|
| 4,459,334 | 7/1984 | Blanpied | 428/219 |
| 5,660,428 | 8/1997 | Catlin | 296/205 |
| 5,674,445 | 10/1997 | Van Ert | 156/212 |
| 5,750,252 | 5/1998 | Danner et al. | 428/332 |
| 5,763,024 | 6/1998 | Yetka | 428/31 |
| 5,771,940 | 6/1998 | Iorio et al. | 138/146 |
| 5,863,365 | 1/1999 | Bird | 156/285 |

*Primary Examiner*—P. W. Echols

[57] ABSTRACT

An apparatus for forming a surface structure. In one embodiment, the apparatus has three stations, with a single-sided mold, or die, at each station. A skin is formed to a single-sided die at the first station, by applying gas pressure to a skin preform placed between the die and a cap that confines the gas against the skin preform, for example. The die and skin are then rotated to a second station where a build-up is applied to the skin, and then rotated to a third station where a backing is applied to the build-up to result in a unitary surface structure.

5 Claims, 8 Drawing Sheets

METHOD FOR FORMING SURFACE STRUCTURES FROM A SINGLE-SIDED MOLD

CROSS REFERENCE TO RELATED APPLICATIONS

This application is being filed concurrently with the following U.S. patent applications: AN ALUMINUM-THERMOPLASTIC PANEL AND METHOD OF MANUFACTURE by Hillier Ser. No. 09/222,544; THREE-DIMENSIONAL INTEGRATED COMPOSITE SURFACE STRUCTURES by Hillier Ser. No. 09/222,182; and APPARATUS FOR FABRICATING SURFACE STRUCTURES by Hillier Ser. No. 09/222,543.

BACKGROUND OF THE INVENTION

This invention is concerned with surface structures having improved structural characteristics over conventional shaped panels, such as may be used in the manufacture of vehicles or in other applications, such as aerospace, industrial applications, military applications, and recreational products. The invention is directed at replacing currently used materials in existing applications, as well as providing new materials for use in new or existing applications.

Panels are used in a wide variety of applications, and come in a wide variety of materials and shapes. Some panels are flat, and some are bent or stamped into a shape. For example, a body panel on an automobile might be stamped from sheet steel or other alloy. In some cases, such a panel might be too weak to act as a structural component of the assembly, and is fastened to a frame or chassis. In other instances, the panel may be sufficiently strong to provide structural support, or may be welded or otherwise joined with other sheet steel parts to form an assembly that includes the panel portion for use in the final product.

Unfortunately, a stronger panel generally means a thicker panel. It takes more energy to form a panel into a given shape if the material is thicker, and thicker material might limit the shapes that can be formed. Also, a thicker panel is heavier. Thus, simply making a thicker panel to obtain strength adds to both the material costs and the fabrication costs, as well as the weight of the final product, particularly if a panel is made from steel sheet.

Thinner panel pieces are often shaped and then spot-welded into a box-like assembly. The various pieces support each other to make a structural element of desired strength and rigidity, which often weighs less than either a thin sheet attached to a frame, or a thick structural panel. However, thinner panels are not without problems, such as denting and rust-through. Thin sheet steel dents relatively easily, even from minor impacts, and might rust entirely through in a short time if corrosion protection fails.

Alternatives to making body panels from stamped steel sheet have been developed to overcome some of the limitations of steel panels. One approach has been to fabricate panels, or even complete bodies, out of re-enforced resin (so-called "fiber-glass") composites. Fiber-glass parts are generally lighter than comparative steel parts, allow greater choice in the types of shapes that may be fabricated, and do not rust. Fiber-glass parts are typically attached to a frame, as they are typically not structural, as they tend to fail under strain when in sheet form, although sometimes a shape is built up or adhesively attached to provide mechanical strength. However, fiber-glass parts tend to crack or splinter on impact, rather than absorbing much energy from the impact, and are considered to be relatively fragile, and scratch easily. Other re-enforced resin systems, such as "carbon-fiber" systems have been developed to improve some of the shortcomings of fiber-glass parts, but are typically more difficult to work with, and more expensive. In some applications, fiber-glass or other composite parts are molded into a thick, structural part of complex (multiple curved surfaces) part.

Molded parts and stamped steel or other alloy parts both are typically made in a process using a two-part mold or two-part stamping die, respectively. Making two-part mold tooling is fairly straight forward, but the resulting sprues and seams must be trimmed from the part before the part can be considered finished. Also, the material, which is typically injected into the mold in a fluid form, must typically be left in the mold long enough to solidify, either by cooling or by chemical reaction, to solidify enough to retain the shape of the mold upon removal. The mold dwell time can slow down the entire fabrication process, thus increasing costs.

Stamping steel or other alloys also requires substantial tooling costs. A stamp and die are both precision tools that must match, and that typically accept a particular material of a particular thickness. Changing the design of a stamped part is expensive and time consuming. Stamping steel sheet or other alloy has other problems that limit the type of shapes that can be formed. For example, there is a certain maximum depth, also known as aspect ratio, that a particular sheet can be drawn to. Trying to stamp sheet into certain shapes can cause pulling and stretching of the sheet, particularly puckering, or webbing, in areas adjoining the seam of a curved area.

Therefore, a panel that may take a shape with complex curves that is light, strong, dent resistant, and corrosion resistant is desirable, and a method for making such panels that is efficient and adaptable to various materials and shapes is further desirable.

SUMMARY OF THE INVENTION

An apparatus for forming a surface structure on a single-sided mold fabricates a skin portion and then applies a build-up section and a backing to result in a light, strong, versatile structural element. In one embodiment, a three-die platen is rotated between three work stations. The skin is formed in a single-sided die from metal sheet by a gas pressure ramp at the first station, a polymer build-up is applied to the skin at the second station, and a backing is formed to the build-up at the third station. The build-up is applied in a hexagonal, or honeycomb, pattern for example, transitioning to a columnar pattern on the end that the backing will be applied to. In another embodiment, a flame sprayer is used to form a metal skin on the mold and then the build-up is either formed from metal flame-sprayed in a desired pattern, or a different build-up material, such as polymer resin, is dispensed from a second nozzle. In yet another embodiment, a casting pattern for a surface structure is formed from a single-sided mold by first applying a sheet of casting pattern material, such as wax, to the mold, and then forming the build-up. The sheet may vary in thickness, as may the cell walls of the build-up or the cell dimensions.

These and other aspects of the invention will be better understood by reference to the following detailed description in connection with the accompanying drawings.

DESCRIPTION OF THE PREFERRED EMBODIMENTS

A composite panel including a skin, a center build-up section, and a backing can be fabricated into a variety of shapes, including shapes having complex curves, from a variety of materials. The composite panel results in a surface structure with desirable and selectable characteristics, such as weight, stiffness, corrosion resistance, impact resistance, and cost. The skin can be plastic or metal, such as aluminum, titanium, or stainless steel, for example, and the center can be thermoplastic resin, thermosetting resin, or combinations thereof, including resin-filler composites, as well as other materials, such as metal. In one embodiment, a nozzle on a multiple-axis carriage discharges heated thermoplastic resin to build up a polymer center in a particular pattern on a shaped skin. The polymer center has sufficient strength to serve as a die for setting, i.e., shaping, the backing, which may be aluminum sheet, for example. This allows the center to be directly bonded with the skin and the backing, and also results in conformal fidelity and integration of the skin, center, and backing without the use of intermediary adhesives.

Figure 1A:
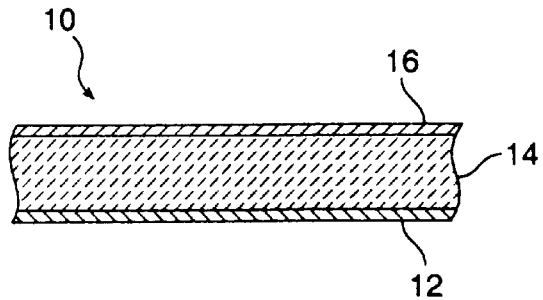
FIG. 1A is a simplified cross section of a composite panel according to the present invention.

FIG. 1A is a simplified cross section of a composite panel 10 according to one embodiment of the present invention. A skin 12 is joined to a center section 14, also known as a "build-up", which is joined to an encapsulating skin 16, or backing. The skin can be metal sheet, such as 6061-O condition aluminum, other aluminum, such as 1100-O, 3003-O, 5052-O, and 7075-O, titanium, stainless steel, such as type 4300, plain steel, such as ASTM-A620, super-plastic alloy, polymer, such as a thermoplastic or thermosetting plastic, including ABS, polycarbonate, polyethylene, polyurethane, and type I or II PVC, or other material, such as a woven material, including materials woven from ceramic or glass. It is generally desirable that the skin material have good tensile strength.

The build-up 14 is a polymer material that is built-up on the skin, rather than being adhesively attached to the skin with an intermediary adhesive layer. The build-up is applied to the skin while the skin is in condition for the build-up to bond to the skin, either through mechanical bonding, chemical bonding, or both. In the case of a metal or thermoplastic skin, the skin can be heated prior to applying the build-up material. In the case of a thermosetting skin, the skin can be partially un-cured while the build-up material is applied, or treated with a surface activator, thus allowing the skin to intimately bond with the build-up. Examples of thermoplastic materials include polyvinyl chloride, polycarbonate, acrylic resins, acrylonitrile-butadiene-styrene ("ABS"), polyethylene, and polypropylene. Examples of thermosetting materials include epoxies, vinyl esters, polyesters, urethanes, phenolics, and polyimides.

The build-up material is applied to the skin as by spraying, flame-spraying, extruding, or otherwise dispensing, and is generally applied in a fluid state, such as a liquid, although some materials, including composite materials, may be applied in a powder state, and then processed to bond to the skin. Of course, not all build-up materials will be compatible with all skin materials, but several examples are provided below. In an alternative embodiment, a casting pattern is made, such as by dispensing liquid casting wax on a wax sheet in the mold to produce a casting pattern for a surface structure.

The backing 16 is typically aluminum sheet, polyamide film, or the like, and is intimately bonded to the build-up 14. The backing preferably has good tensile properties, and is at least slightly conformable, so that intimate contact with the build-up can be obtained. The back-up material can be heated or treated with a surface sensitizer, or only partially cured, when the backing is applied to obtain good chemical bonding between the build-up and the backing. Additionally, pressure is used to press the backing against the build-up to bring the two layers in contact. The pressure may be mechanically applied, such as by rolling, or may be hydrostatically applied, such as by gas pressure. The build-up has sufficient strength to support the applied pressure. During this process, the skin is externally supported, by a table or die, for example, so that the composite surface structure does not deform. The combination of the skin 12, build-up 14, and backing 16 form a box-like structure in which the skin and backing, separated by the build-up, provide tensile strength to resist deformation of the composite surface structure in various directions.

Figure 1B:
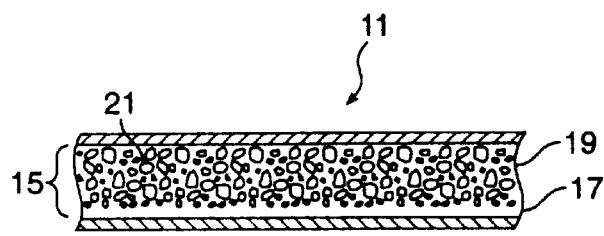
FIG. 1B is a simplified cross section of a portion of a surface structure with a graded filler build-up section.

FIG. 1B is a simplified cross section of a portion of a surface structure 11 according to another embodiment of the present invention. The build-up layer 15 is graded to obtain a selected property. For example, the build-up layer may start as a single phase 17 (pure build-up material), and then transition to a filled material 19. The filling material 21 may be gas bubbles, such as nitrogen that is entrained in the stream of build-up material as it is applied to the skin, microballons, such as glass microballons, microshperes, such as aluminum, glass, or ceramic microspheres, or gas bubbles may be generated in the build-up material itself. For example, if polycarbonate is used as the build-up material, the single phase portion of the build-up layer can be applied at a temperature that liquefies the polycarbonate, and the temperature can be raised when applying the filled material to spontaneously cause bubbles to form and become entrapped in the polycarbonate, such as supplying the polycarbonate at a temperature of about 485° F. with the nitrogen at about 210° F. at a pressure of about 4–5 psi.

Selected superior material properties may be achieved depending on the desired characteristics of the surface structure 11. For example, entraining or generating gas in the filled material section can lighten or improve the thermal insulation properties of the surface structure. A reactive gas, such as oxygen, can be entrained in a build-up material, such as polyester, to improve the cure time. In a preferred embodiment, microspheres are mixed with the polymer or thermosets used in the build-up layer to provide compressive strength. Other solid forms, such as fibers, particularly carbon fibers about 0.0003 inches in diameter and less than about 0.063 inches long, may be used alternatively or in addition to the microspheres, but microspheres generally provide better compressive strengthening than fibers as the microspheres do not exhibit as much of a problem arising from inter-laminate shear. Generally, fill ratios range between about 20–33 volume %, but other fill ratios may be appropriate depending on the base material and filler used. The microspheres may be solid, such as spherical aluminum metal powder, or may be hollow, such as zirconia or glass bubbles. The microspheres range in diameter from approximately 0.0015–0.008 inches, and a single size of microspheres may be used in the build-up layer, or microspheres of various sizes may used for better packing density of the spheres. Additionally, spheres of various materials may be combined in a single build-up layer.

Figure 1C:
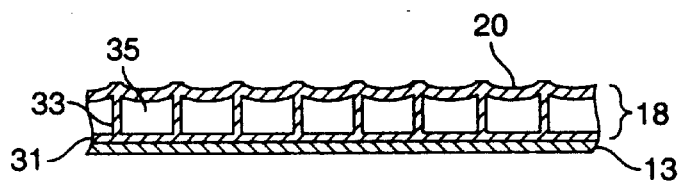
FIG. 1C is a simplified cross section of flat surface structure according to one embodiment of the present invention.

FIG. 1C is a simplified cross section of a flat surface structure having a having a skin 13, such as sheet metal, a build-up section 18, and a backing 20. The build-up section 18 includes a first zone 31 contacting the skin 13 essentially over the entire interface between the skin and the build-up section, and a second zone having walls 33 that form box-like voids 35 in the build-up section. The backing 20 seals the voids, the combination of which provides stiffness to the surface structure. The walls of the voids also provide "give" to the surface structure for improved dent resistance by transferring loading to global buckling and then post-catastrophic failure of the hexagonal cells to local buckling. In some embodiments the voids may be evacuated to provide improved thermal insulation or mechanical properties, or may be pressurized with air, nitrogen, water, oil, or other fluid to improve thermal conductivity, impact resistance, or other mechanical properties.

Figure 1D:
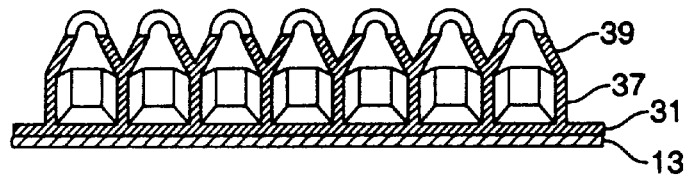
FIG. 1D is a simplified cross section of a flat surface structure with a hex-to-round build-up cell, according to another embodiment of the present invention.

FIG. 1D is a simplified cross section of a portion of a surface structure showing cells that transition from a hexagonal cross section 37, or pattern, to a columnar (round) cross section 39. The hexagonal cell pattern contacts the skin 13 in a continuous fashion, that is, the walls of the hexagonal cells provide support to the skin without gaps between cells, thus improving the strength of the surface structure, while the columnar cells provide superior crush resistance. The hex-to-round cell structure combines these characteristics to result in a superior support for a skin.

Figure 2:
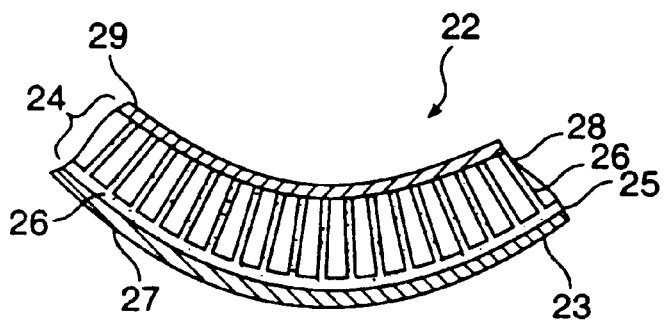
FIG. 2 is a simplified cross section of a curved surface structure, according to another embodiment of the present invention.

FIG. 2 is a simplified cross section of a portion of a surface structure 22 with a curve. The curve is shown only in the plane of intersection, but may also have components of curvature that are not co-planar with the plane of intersection, and the surface of the skin can define a number of curves, such as may be defined with a non-uniform rational B-spline ("NURBS") surface. The skin 23 is 6061 aluminum sheet that was originally about 0.060 inches thick., but thinner aluminum alloy sheet could be used, such as 0.009 inch thick, or steel sheet about 0.010 inches thick, or thermoplastic sheet 0.0045 inches thick. The 6061 aluminum sheet is in the O condition, as that condition is less prone to cracking when formed than aluminum sheet in the T6 condition. The build-up 24 is polycarbonate, for example, and is dispensed in a selected pattern on the skin from a computer-controlled 5-axis nozzle to a final thickness of approximately 0.090 inches The nozzle and skin are heated so that the polycarbonate may be easily dispensed through the nozzle and form a good chemical bond with the skin. The surface of the skin has been textured during a forming process that will be described in further detail below.

The polycarbonate, which may contain fillers is dispensed on the skin in a pattern resulting in three zones. Some types of fillers, such as carbon fibers, may be used to strengthen the composite resin, other types of fillers, such as microballons, may reduce the effective viscosity of the resin to aid in dispensing the resin, as well as strengthen the resin or improve other properties, such as thermal insulation. The first zone 25 is a sheet of polycarbonate contacting the skin over its entire surface. Complete contact with the skin provides good adhesion and shear strength between the skin and the build-up section 24, which is about 0.004 to 0.030 inches, preferably at least 0.010 inches, thick. The second zone 26 is a region of hexagonal cells, or "honeycomb". The hexagonal cells are formed by dispensing the polycarbonate in a hexagonal pattern over the first zone sheet 25 in multiple passes. As the polycarbonate cools and solidifies after extrusion from the nozzle, the hexagonal cells are built up. The walls 26 of the hexagonal cells are essentially perpendicular to the surface 27 of the skin around the curve to provide good support to the skin. Other laminates with hexagonal cores are generally limited to flat sections, so that the cell walls are perpendicular to the surface, or are machined to fit curved surfaces, in which case the cell walls are not always perpendicular to the surface. It is desirable to have the cell walls perpendicular to the surface to resist buckling upon impact. If desired, the hexagonal cells may be tapered to improve impact deceleration, or may remain constant in cross section to support higher static loads.

The third zone is a region of columnar cells 28. The build-up transitions from the hexagonal zone 26 to the columnar zone 28. The columnar cells are less likely to collapse than similar hexagonal cells, while the hexagonal cells provide superior support to the skin than columnar cells, thus a build-up of superior properties is obtained by transitioning from the hexagonal structure to the columnar structure so that global loading is converted to localized loading, and critical deformation occurs on the backing, rather than the skin. The transition from one zone to another is achieved by controlling the delivery rate, direction, and speed of the delivery nozzle.

Applying the build-up to the skin offers many advantages over conventional laminates. As discussed above, all of the cell walls are essentially perpendicular to the skin, even the curved portions of the skin. Also, the thickness of the cell walls may be adjusted along the length of the cell by varying the dispensing rate, e.g. pressure or nozzle speed, to optimize characteristics of the surface structure for various combinations of materials and configurations. The cell dimensions, or pitch, can also be varied, to provide more cells in areas requiring greater support, for example. The cross-cell dimension for hexagonal cells is generally between about 0.125–1.00 inches, and the cells typically have an aspect ratio of about 4.

A backing 29 of 6061 type O aluminum approximately 0.010 inches thick is formed over the build-up 24. The backing is applied to the build-up while the build-up is still warm enough to deform and bond to the backing, but strong enough to provide at least about 70% of the ultimate (cold) compressive strength of the build-up. Gas pressure is used to press the backing against and into the build-up, conforming the backing to the surface of the build-up and intimately bonding the backing to the build-up to achieve a unitary surface structure 22 comprising the skin 23, build-up 24, and backing 29. The above structured build-up, or other structured build-ups, can be applied to flat panels, as well. In alternative embodiments, metal is flame-sprayed from a nozzle to form the build-up section on a formed skin. Higher aspect ratios may be obtained if the nozzle is used to flame-spray a skin section on the single-sided mold prior to forming the build-up section. Similarly, a plastic skin section may be dispensed onto a single-sided mold prior to forming a build-up section on the skin. The material used for the skin and the build-up may be the same, or different, and a single nozzle or multiple nozzles may be used. When the skin is dispensed on the mold, differential thermal expansion/contraction between the build-up material and the mold material can be used to assist in removal of the build-up material.

Figure 3A:
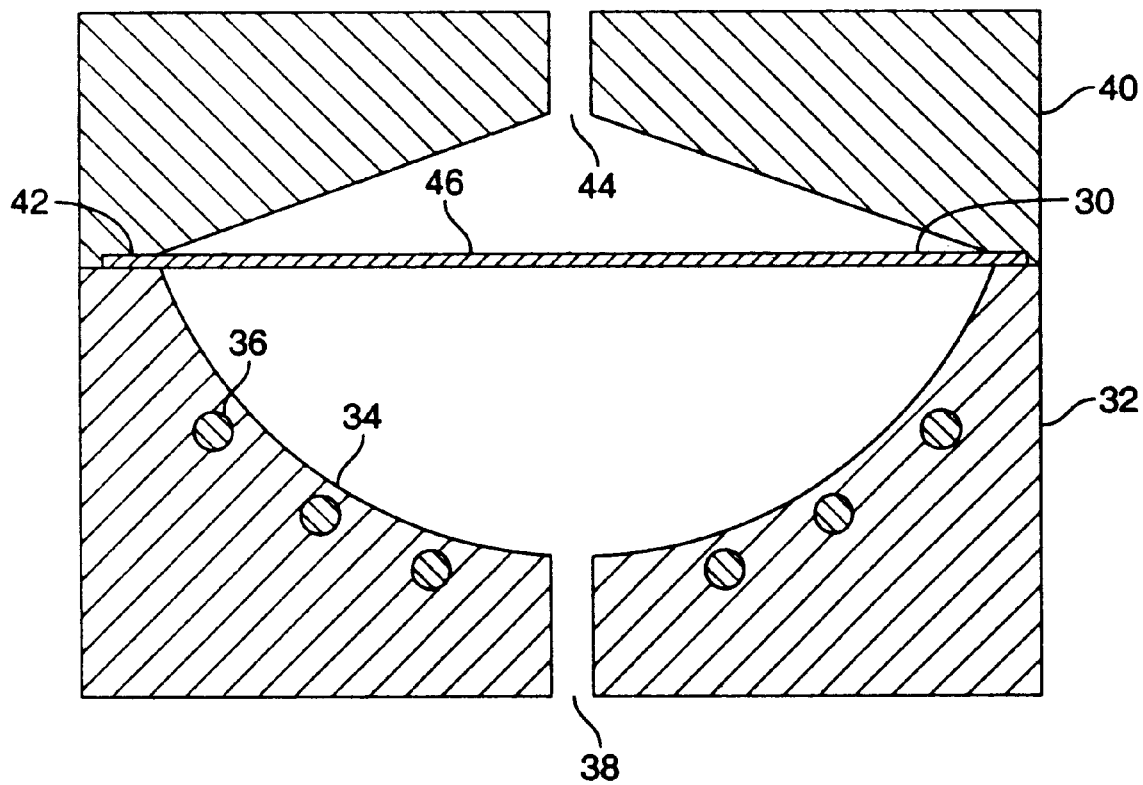
FIG. 3A is a simplified cross section of a skin preform in a single-sided mold.

FIGS. 3A to 3D are simplified cross sections illustrating a process according to the present invention. FIG. 3A shows a skin preform 30, in this case a sheet of 6061 O-type aluminum 0.010 inches thick, in relation to a single-sided die 32. The single-sided die 32 is shown with a simple curve 34 for purposes of illustration only, and may define a NURBS surface with an aspect ratio appropriate for the selected skin preform, and may be a "live" die (not shown). A live die has movable portions that can further shape the skin preform after forming it to the initial single-sided die. It will be appreciated that a single-sided die is much less expensive to fabricate than an equivalent stamp-die. In fact, the single sided die may be fabricated using computer numerical control ("CNC") machining methods and similar software as was used to design the surface structure, thus simplifying the design-tooling process. Similar software may then also be used to control the build-up material delivery nozzle.

Cartridge heaters 36 inside the die heat both the die and the skin preform, in this case to about 450° F., to soften the skin preform and assist in the formation process. A vacuum port 38 delivers a vacuum between the skin preform and the die, and a clamp 40 holds the skin preform in place and provides a nominal metal-to-metal seal 42. An inlet port 44 in the clamp 40 admits gas, such as heated nitrogen, on the distal side 46 of the skin preform at a pressure between 20–110 psi, preferably about 45 psi, and at a controlled rate for a ramp-up period of about 20 minutes to conform the skin preform to the shape of the die. The length of the ramp depends on the desired aspect ratio. A 20 minute ramp is appropriate for an aspect ratio of 0.6 in 0.060 inch thick sheet of 6061-O, for example, while an aspect ratio of 0.1 requires only a 2 minute ramp. The gas flow is controlled by a dome pilot operated gas valve, available from TESTCOM of Elk River, Minn., for example, the valve being computer controlled to provide the selected gas flow rate. For other skin preforms, such as a MYLAR™ skin preform, the skin is formed in as little as two minutes, and a computer-controlled valve is optional. When the aluminum skin preform is conformed to the die, the surface of the skin becomes slightly textured, like an orange peel. This texturing enhances the subsequent bonding between the skin and the build-up. Furthermore, the use of a gas to conform the skin preform to the die results in a clean surface, unlike the surface that would be obtained if another fluid, such as an oil, were used to hydroform the skin. Additionally, the gas has relatively little thermal capacity, and is easily vented, thus the cool-down of the skin in preparation for the build-up is relatively fast.

When using other metals, such as titanium or stainless steel, for the skin preform, an additional step of explosively setting the skin preform to the die may be desired to overcome spring-back. An explosive set is a rapid discharge of gas applied to the distal side of the skin preform after the skin preform has been formed to the die by the initial gas ramp. For example, a skin preform of 3045 stainless steel 0.006 thick and approximately six inches in diameter may be explosively set to the die with a burst of heated nitrogen at reservoir pressure of 650 psi that releases 1,500 cubic inches in about 0.14 seconds to the distal side of the skin preform. The gas is transferred from the reservoir to the skin preform via a burst-diaphragm poppet valve, also known as a "rupture valve", available from PETER-PAUL ELECTRONICS COMPANY of New Britain, Conn.

Figure 3B:
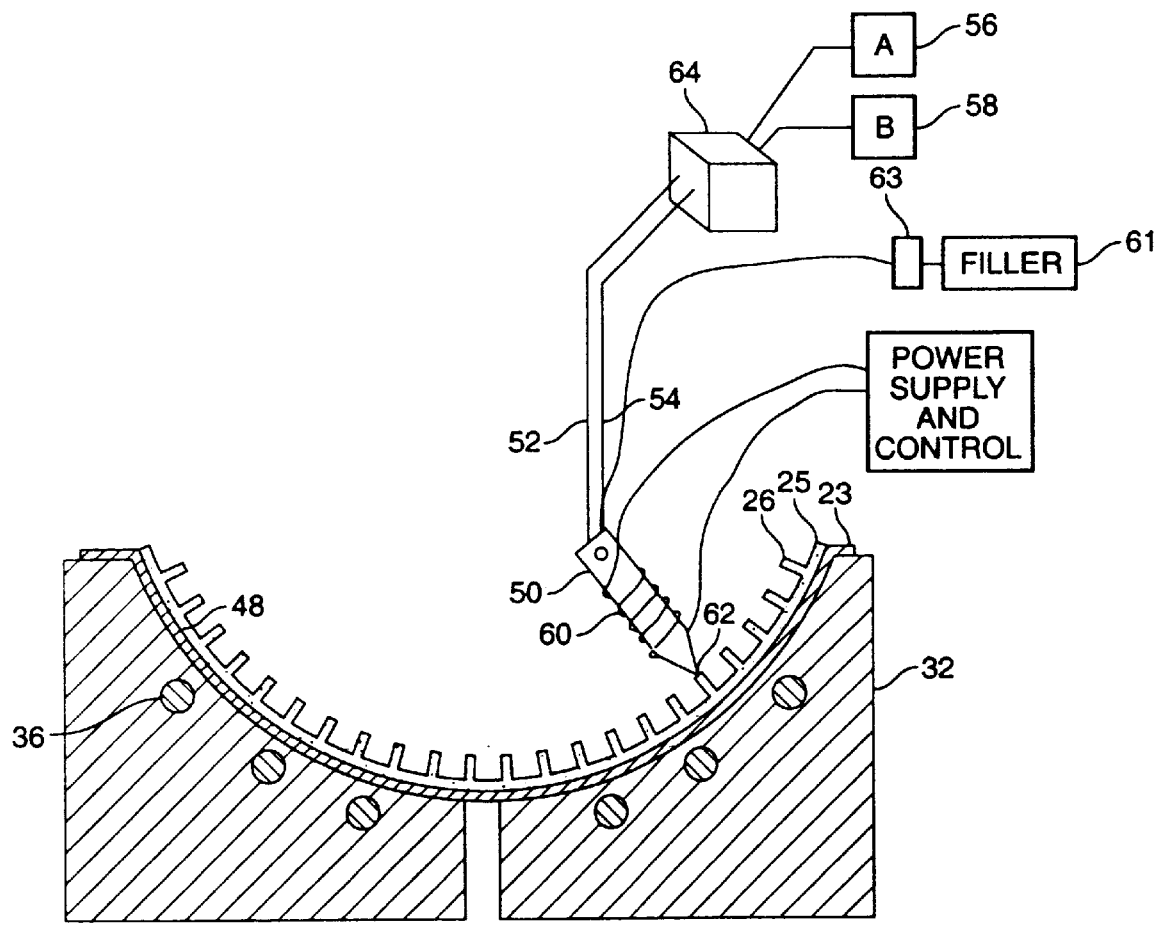
FIG. 3B is a simplified representation of build-up being applied to a curved skin.

FIG. 3B shows the skin 48 after forming to the die 32. The skin is dry, clean, and warm, and is ready for the build-up to be applied. A nozzle 50 applies polymer to the skin in a selected pattern, as described above. The nozzle has two inputs 52, 54 for a two-component (A and B) polymer 56, 58, such as an epoxy system or a styrene-acrylonitrile/polybutadiene system, but could easily be used to dispense single-component polymers, such as polyvinylchloride or polycarbonate. Additional nozzle inputs (not shown) may be present to add accelerators, initiators, plasticizers, or the like to the polymer before applying the polymer to the build-up layer. The nozzle has a heater 60 for heating some polymers to lower their viscosity. The nozzle has an orifice 62 approximately 0.090 inches in diameter and the nozzle can travel at speeds up to 20 feet-per-second, although these specifics are given as examples only and are not meant to limit the invention. The nozzle has delivered polymer to build up the first zone 25 next to the skin 23 and has started to build-up a second zone 26 of honeycomb cells, which are exaggerated in height for ease of illustration.

Filler 61, such as microspheres or fibers, is supplied to the nozzle 50 by a positive-displacement pump 63, where the filler combines with the resin. In some instances it may be desirable to combine the filler with the resin in an optional premixer 64, which can also be used to mix multi-component resins or a resin and other substance, such as an accelerator or plasticizer. In other instances, multi-component resins may be supplied to the nozzle, where they mix prior to being dispensed on the skin. In this instance, glass spheres are used as a filler. The spheres are approximately 0.00015 to 0.008 inches in diameter and are sold under the name K-20 ZEEOSHPERES™ available from 3M/Specialty Additives Division of Saint Paul, Minn., for example. Alternatively, zirconia microballons or ceramic spheres of similar dimensions may be used. The microspheres improve the fluidity, i.e. lower the viscosity, of the dispensed polymer. Lowering the viscosity of the applied polymer by the addition of microspheres or microballons is particularly desirable when dispensing thermoplastic resins, which generally have a higher viscosity than many of the thermosetting resins at similar temperatures. Lowering the viscosity of the applied resin also allows use of a smaller orifice on the nozzle (for given delivery pressure) for more precise dispensing of the build-up material, and also results in a higher flow rate, thus reducing the time required to build-up a given structure. Glass microballons are preferred to use in conjunction with polycarbonate polymer because of the high delivery pressures used to extrude the polycarbonate through the nozzle. These delivery pressures are obtained by pulse-width modulation before the nozzle.

Other types of spherical fillers can be used, for example, solid aluminum microspheres will withstand high delivery pressures used in conjunction with some resins, or other types of microballons may be used to fill other polymers, such as epoxy resins, which can be delivered at a lower nozzle pressure. Fillers may be combined for some applications, including a variety of different microspheres, or microspheres in combination with other fillers, such as fibers to improve tensile strength, or other solids, such as clay, cellulose, or silica may be used.

Figure 3C:
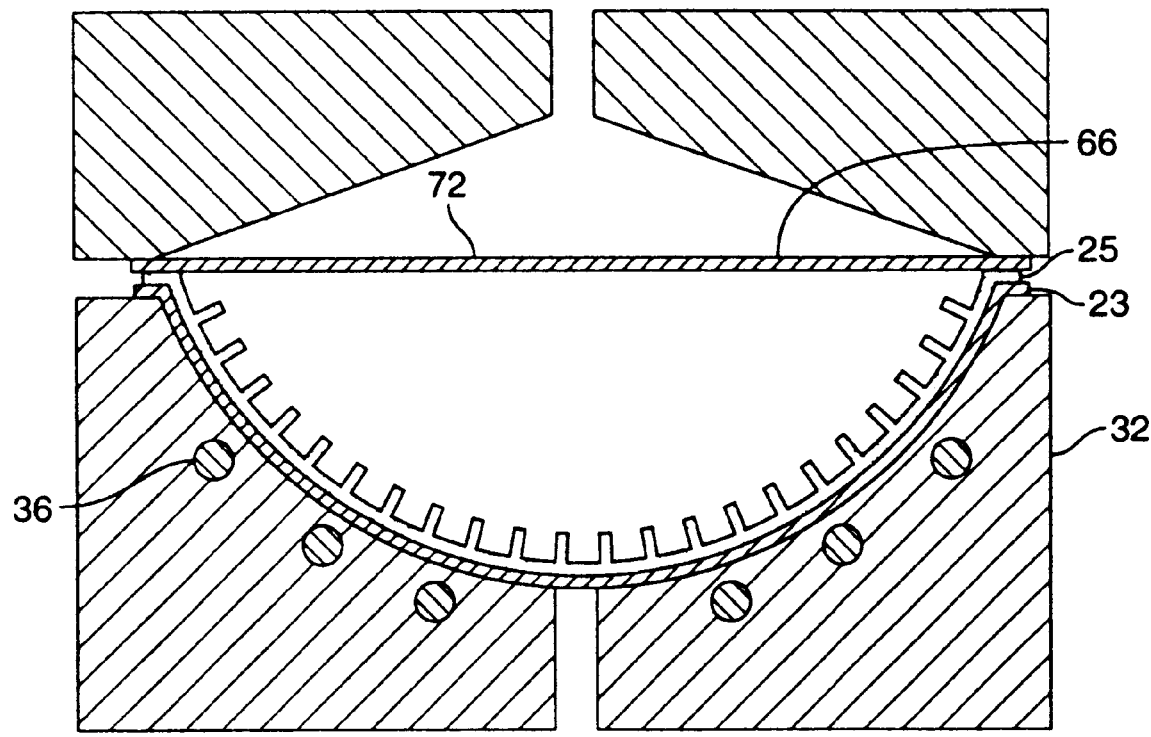
FIG. 3C is a simplified cross section of a skin and build-up section in a single-sided mold with a backing preform.

FIG. 3C shows the skin 23 and the build-up 25, which have not been removed from the die 32 since the skin was formed to the die, and a backing blank 66 positioned for assembly to the build-up. The backing blank is a sheet of 6160-O aluminum approximately 0.010 thick, but could be other material, as discussed above in relation to the skin. In general, it is preferred that the material of the backing blank provide tensile strength to the back of the surface structure. In this instance, in which the build-up has been patterned into a honeycomb transitioning to columns, another desirable feature of the backing blank is that it is deformable.

As for the skin-forming process, described above, the backing blank 66 is heated to about 250° F. by hot nitrogen. The build-up 25 is maintained at a temperature of approximately 210° F. by the cartridge heaters 36 in the die. This temperature allows the build-up layer to attain approximately 70% of its compressive strength while remaining slightly softened, so that the backing will bond to the build-up during the backing-forming process. Other build-up materials may have greater or lesser portions of their ultimate compressive strength during the backing-forming process, depending on the strength of the build-up and the type of backing blank used.

Figure 3D:
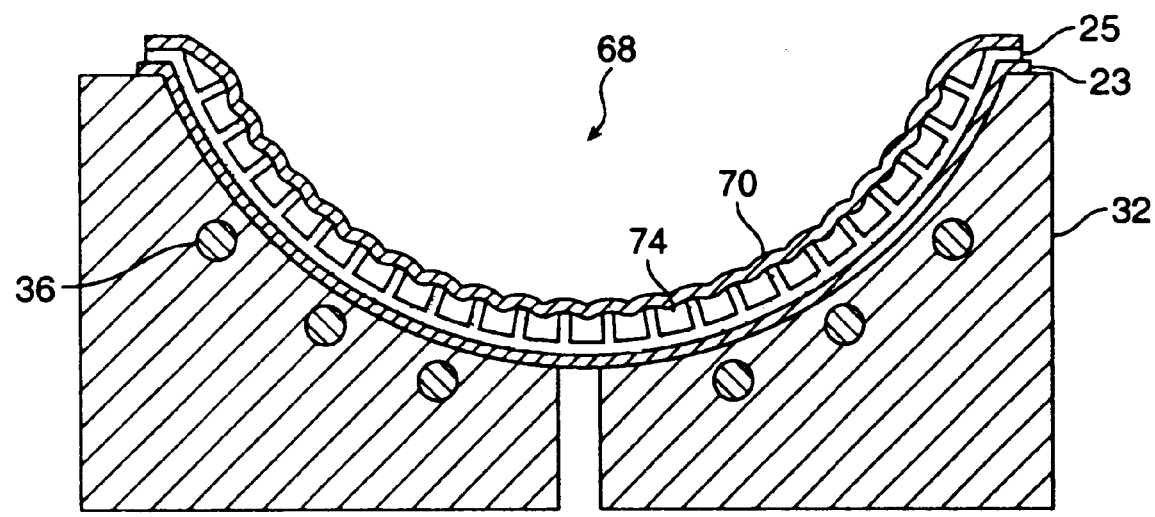
FIG. 3D is a simplified cross section of a surface structure in a single-sided mold after application of the backing to the build-up section.

FIG. 3D shows the surface structure 68 in the die 32 after the backing 70 has been formed and bonded to the build-up 25. The backing has been formed to the build-up by applying a burst of gas to the distal side 72 of the backing preform (see FIG. 3C). The gas was applied at a pressure of approximately 30 psi. Of course, if the build-up is substantially flat, such as is shown in FIG. 1C, the backing would not have to deform to the structure of the build-up, but should still conform to the surface of the build-up. In the present example, the backing 70 acts as an encapsulating skin seals gas in the voids 74 of the build-up layer 25. These gas-filled voids enhance shock absorption of the surface structure 68 and also provide thermal insulation between the skin 23 and the backing 70. In some embodiments, forming a metal backing to the build-up work-hardens, or strain-hardens, the backing to provide additional strength.

Figure 4A:
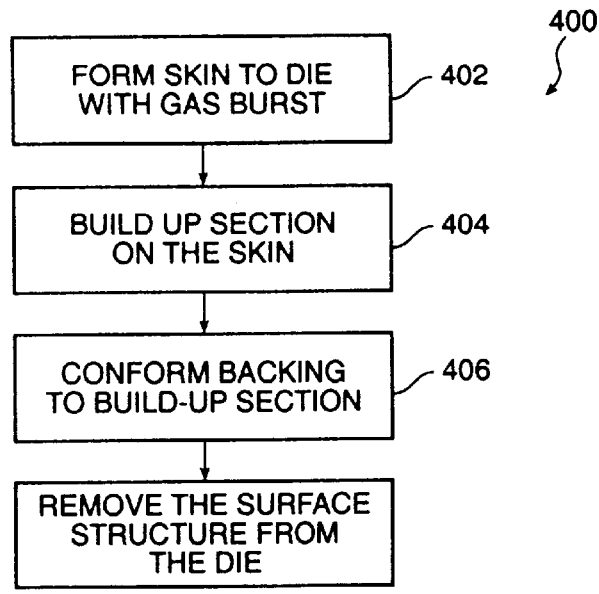
FIG. 4A is a simplified flow chart of a process for making a surface structure according to one embodiment of the present invention.

FIG. 4A is a flow chart of a process 400 used for fabricating a surface structure according to an embodiment of the present invention. A skin preform is formed to a single-sided die by applying gas pressure (step 402). Then, without removing the skin from the die, the build-up layer is formed on the skin (step 404). Next, the backing is conformed to the build-up layer (step 406).

Figure 4B:
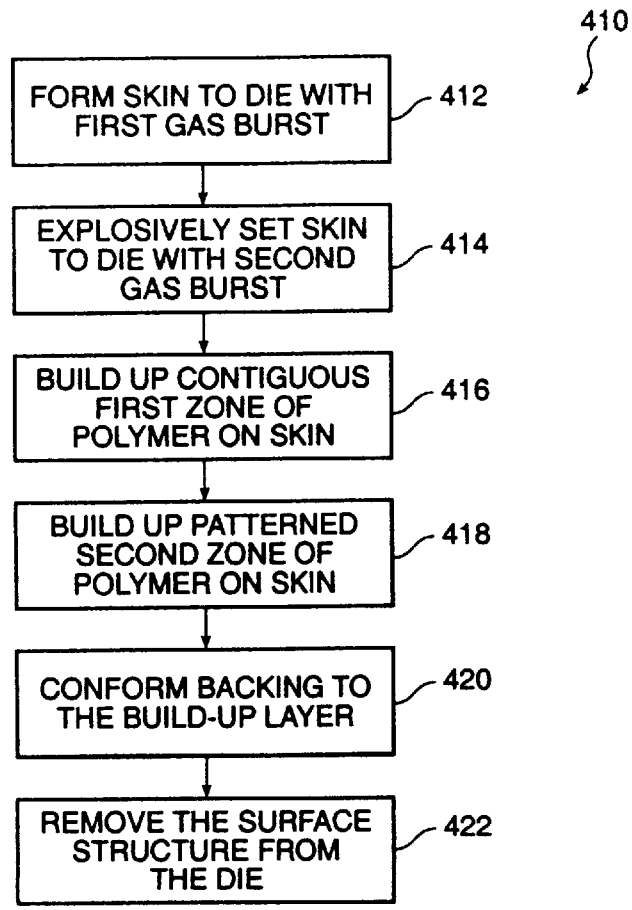
FIG. 4B is a simplified flow chart of a process for making a surface structure with an explosive-set skin.

FIG. 4B is a flow chart of another process 410 used for fabricating a surface structure according to another embodiment of the present invention. A skin preform is formed to a single-sided die with a ramp of gas pressure (step 412) starting at between 20–110 psi increasing at 2–9 psi per minute. The skin preform is then explosively set to the die (optional) with a burst of gas (step 414) at 45–650 psi, increasing at 45–650 psi per second. A first zone of a build-up layer is formed on the skin by applying polymer to the surface of the skin (step 416). A second, patterned, zone is formed on the first zone of the build-up layer by applying polymer through a nozzle that is controllably moved to create the desired pattern (step 418). Optionally, additional zones may be applied, either by applying polymer through the nozzle, or by other means (not shown). A backing is conformed to the build-up layer (step 420), and the surface structure is removed from the die (step 422).

Figure 5A:
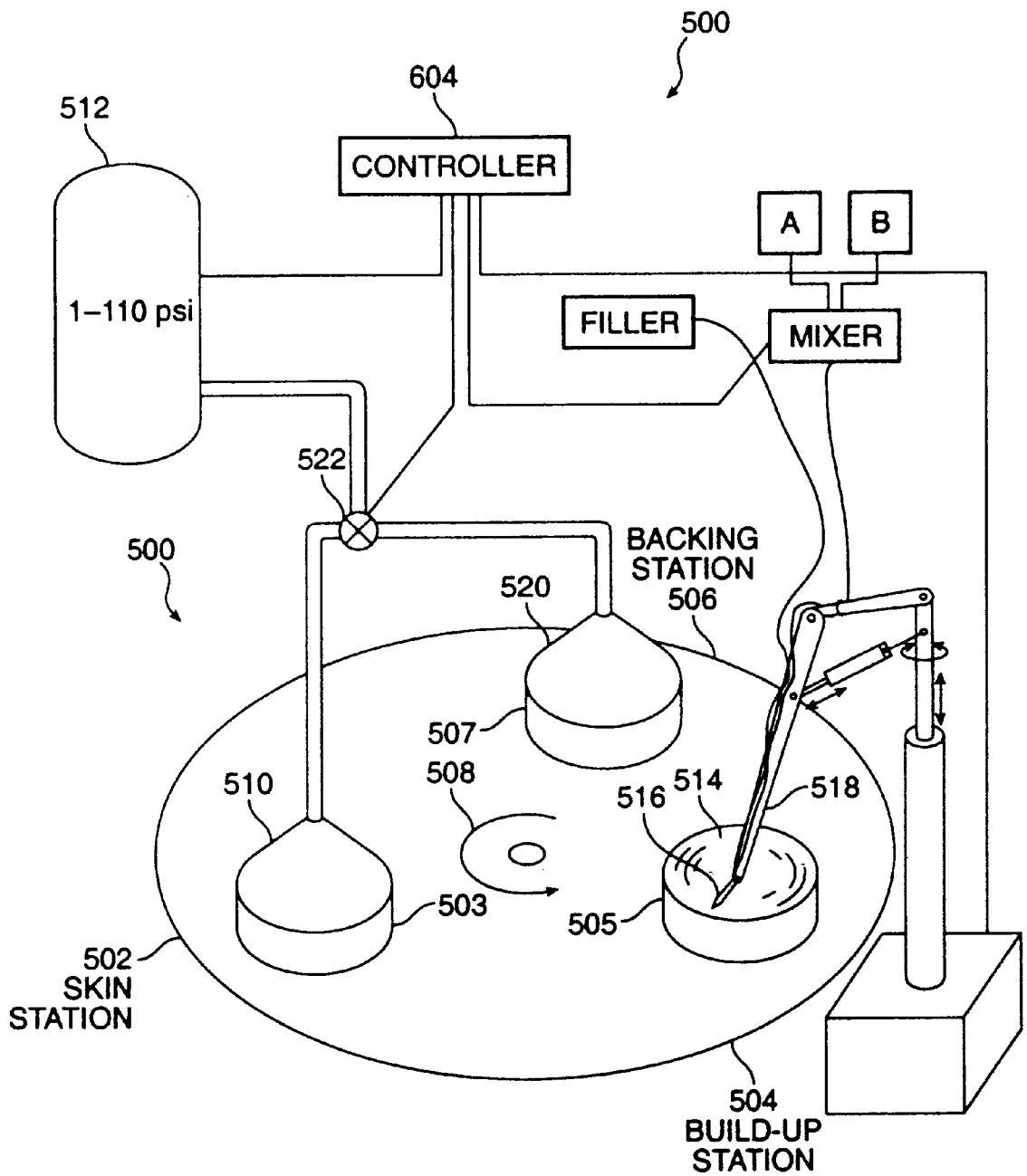
FIG. 5A is a simplified illustration of a three-station apparatus for fabricating surface structures.

FIG. 5A is a simplified diagram of a three-station surface structure fabrication apparatus 500. The apparatus has three stations 502, 504, 506 and three die 503, 505, 507. After processing at each station, the die are rotated 508 to the next station so that the surface structure is formed without removing any component of it from the die until the structure is completed. The first station 502 includes a first die 503 and cap 510 and applies gas from a gas reservoir 512 to set a skin preform (not shown) to the first die. The second station 504 includes a second die 505 that has a skin 514 that was formed to the second die when the second die was at the first station. A delivery nozzle 516 mounted on a crane arm 518 applies polymer to the skin to form a build-up layer on the skin.

The third station 506 includes a third die 507 and a cap 520. The die has a skin and build-up layer that were formed at the first and second stations. At the third station, a backing preform (shown) 6061-0 aluminum alloy is conformed to the build-up layer by applying a burst of gas from the gas reservoir 512. A diverter valve 522 selects whether gas from the reservoir will be supplied to the first station 502 or the third station 506. Alternatively, two separate gas reservoirs could be used, one for each station.

The build-up step at the second station typically requires more time than the combined times at the first and third stations, so a single reservoir with the diverter valve simplifies equipment requirements.

Figure 5B:
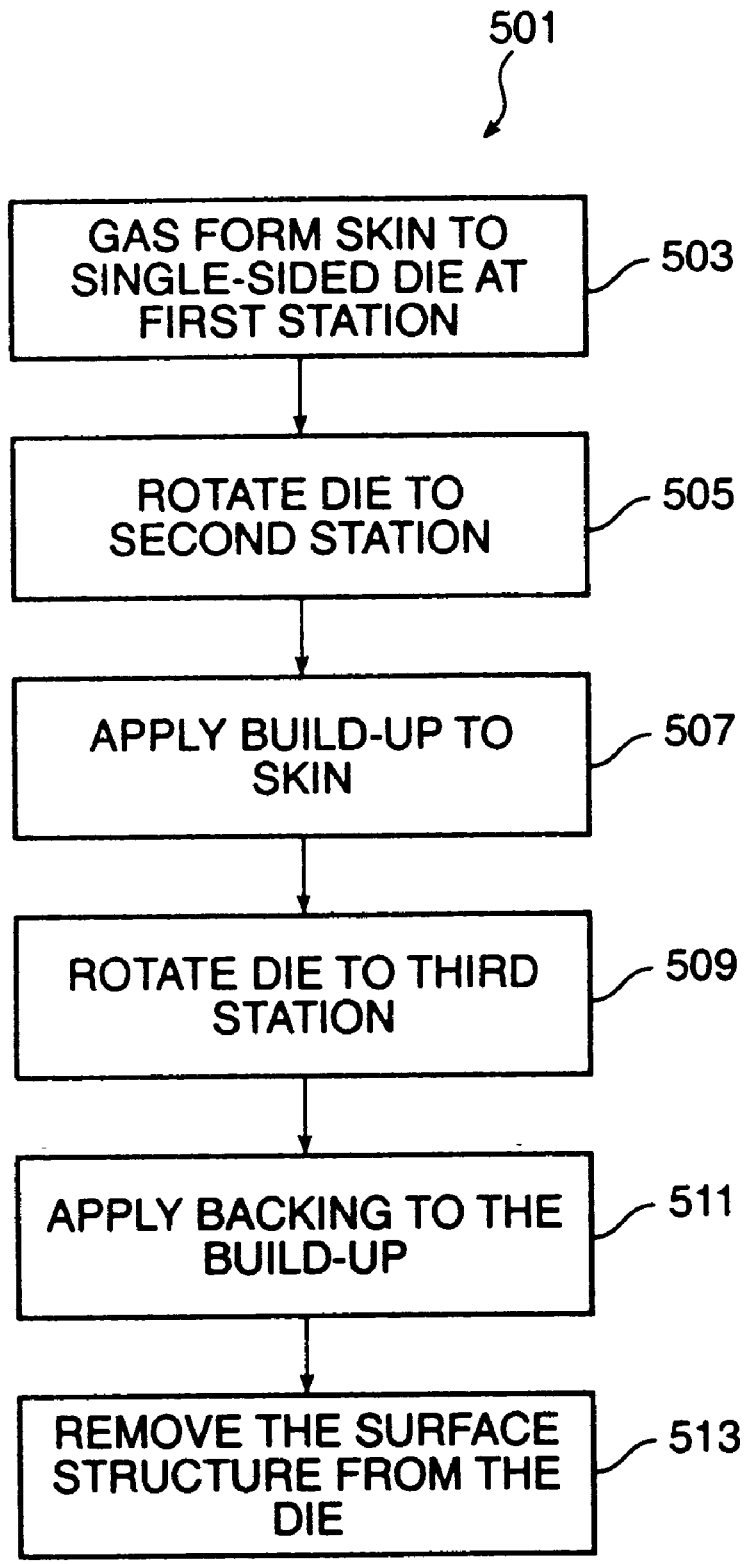
FIG. 5B is a simplified flow chart of a three-station fabrication process.

FIG. 5B is a simplified flow chart of a process 501 for fabricating a surface structure using a three-station line. At the first station, the skin preform is formed to a single-sided die using gas pressure (step 503). The die is then moved to the second station (step 505), where a build-up section is applied to the skin (step 507). The die is then moved to the third station (step 509), where the backing is applied (step 511). The surface structure is then removed from the die (step 513), and the die is readied for another assembly sequence. In a preferred embodiment, the die is moved from one station to the next by rotating a platen supporting at least three single-sided dies. The dies can be all of the same shape, or may define different shapes.

Figure 6:
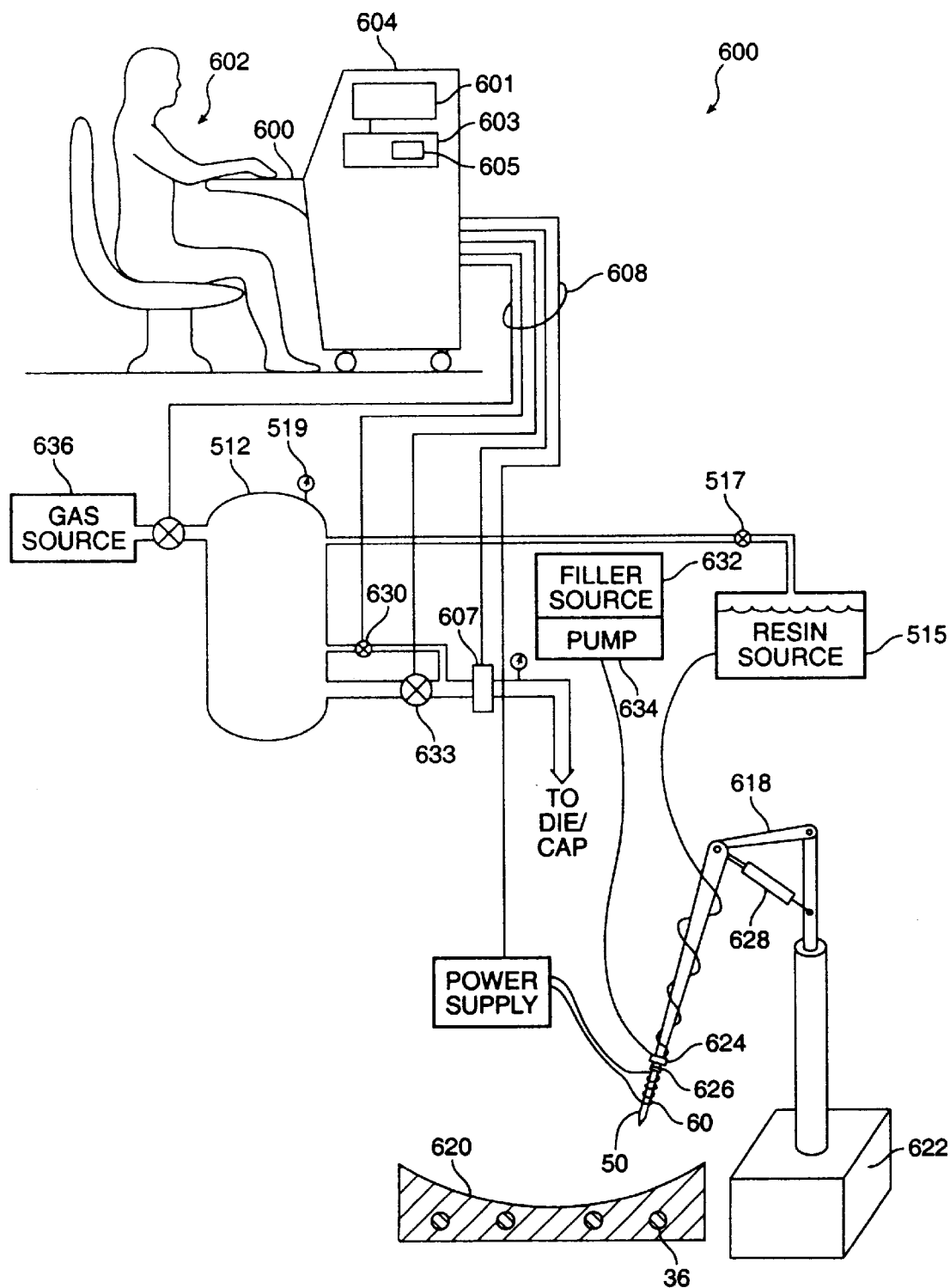
FIG. 6 is a simplified illustration of a system for forming surface structures.

FIG. 6 is a simplified diagram of an apparatus 600 for fabricating surface structures. The apparatus may be used in the three-station apparatus described in conjunction with FIG. 5, or may be used in other configurations, such as a linear assembly line or a single-die system. An operator 602 enters commands to a controller 604 through a user interface 606. The controller could be a personal computer, a single-board computer ("SBC"), or programmable logic control ("PLC") module, for example. The controller includes a processor 601 and a memory 603 that contains an operating program 605 that has been entered into the memory.

The controller controls several functions of the apparatus according to the control program 605 stored in the memory 603 via control lines 608, only a few of which are shown for purposes of illustration. The controller can control the operating pressure of the gas reservoir 512 according to a feedback signal from a pressure gauge 519, the operating temperatures of the gas heating element 607, nozzle heater 60, and die heaters 36, according to feedback signals from temperature sensors, such as thermocouples (not shown), the delivery rate of polymer from the resin source 515 by a gas-pressure control valve 517, and three-dimensional positioning and travel of the nozzle 50, among other functions.

The controller can control the addition of filler, such as microspheres or fibers, from a filler source 632 by controlling the operation of a positive-displacement pump 634. Gas pressure may be applied to the die for skin forming or backing operations through a valve 630, while a different valve 633 may be used for explosively setting some skin materials, as described above. The gas reservoir 512 receives process gas from a gas source 636, which could be a gas tank, gas line, or pump, such as a high-pressure pump attached to a liquid nitrogen source.

The nozzle 50 is carried on a crane arm 618. The crane arm is controllably movable with respect to the workpiece 620, and the position and travel of the nozzle is controlled by motors 622, 624, 626, such as stepper motors, servo motors, hydraulic motors, or voice coil motors. In a preferred embodiment, servo motors coupled to the crane 622, are used in conjunction with servo motors mounted on the crane 624, and coupled to the nozzle to position and move the nozzle tangentially to the surface of the skin, while a voice coil motor 626 positions the nozzle perpendicularly from the surface of the skin. A hydraulic ram 628 is also used to adjust the height of the crane arm. Thus, the nozzle may traverse a selected path, such as to define a hexagonal web, while the nozzle maintains a selected distance from the surface of the skin, even on surfaces with multiple and complex curves.

The invention has now been explained with reference to specific embodiments; however, other various modifications, alternatives and equivalents may be used. For example, the composition of material dispensed from the nozzle may be intentionally varied to optimize selected parameters of the surface structure. Similarly, fillers may be combined with the resin in a pre-mixer, rather than at the nozzle. Other embodiments will be apparent to those skilled in the art. Therefore, this application should not be limited except by the following claims.

What is claimed is:

1. A method of forming a surface structure, the method comprising:

shaping a skin on a single-sided mold at a first station;

moving the single-sided mold and the skin to a second station applying a build-up to the skin at the second station moving the single-sided mold, skin, and build-up to a third station; and conforming a backing to the build-up at the third station.

2. The method of claim 1 wherein each moving step comprises a rotation of a mold supporting structure from one station to another station.

3. The method of claim 1 wherein the step of shaping a skin includes applying a gas pressure ramp to a skin preform disposed opposite the single-sided die.

4. The method of claim 3 wherein the skin preform is a metal sheet.

5. The method of claim 4 wherein the skin forming step further includes, after the step of applying a gas pressure ramp, explosively setting the skin preform to the single-sided die with a burst of gas.

* * * * *

UNITED STATES PATENT AND TRADEMARK OFFICE
CERTIFICATE OF CORRECTION

PATENT NO. : 6,098,267
DATED : August 8, 2000
INVENTOR(S) : Loren C. Hillier

It is certified that error appears in the above-identified patent and that said Letters Patent is hereby corrected as shown below:

<u>Title page,</u>
Item [73], Assignee, "LEK Technologies" should read -- LEK Technologies, LLC --.

Signed and Sealed this

Eleventh Day of June, 2002

Attest:

JAMES E. ROGAN
Attesting Officer  Director of the United States Patent and Trademark Office